(12) United States Patent
Gieshoff et al.

(10) Patent No.: US 6,471,932 B1
(45) Date of Patent: Oct. 29, 2002

(54) PROCESS FOR THE PLASMA-CATALYTIC PRODUCTION OF AMMONIA

(75) Inventors: Jürgen Gieshoff, Biebergemünd (DE); Jürgen Lang, Lenningen/Teck (DE)

(73) Assignee: Degussa-Huls Aktiengesellschaft, Frankfurt am Main (DE)

(*) Notice: Subject to any disclaimer, the term of this patent is extended or adjusted under 35 U.S.C. 154(b) by 74 days.

(21) Appl. No.: 09/693,835

(22) Filed: Oct. 23, 2000

(30) Foreign Application Priority Data

Oct. 28, 1999 (DE) .......................................... 199 51 976

(51) Int. Cl.⁷ ................................................ C01C 1/04
(52) U.S. Cl. ............. 423/352; 204/157.43; 204/157.46; 123/DIG. 10
(58) Field of Search ................. 204/157.43, 157.46, 204/157.52, 164, 177, 178; 423/352, 359, 559, 362, DIG. 10

(56) References Cited

U.S. PATENT DOCUMENTS

| 3,344,052 A | * | 9/1967 | Yeh | ............................. 423/352 |
| 3,368,956 A | * | 2/1968 | Yeh | ............................. 423/352 |
| 4,451,436 A |   | 5/1984 | O'Hare | ................... 422/186.29 |
| 4,795,617 A |   | 1/1989 | O'Hare | ................... 422/186.15 |

OTHER PUBLICATIONS

Kunimori et al., Plasma-Induced Chemisorption of Nitrogen and Its Chemical Reactivity on Alumina, Jpn. J. Appl. Phys. vol. 33 pp. 4195–4197 (1994).

Kameoka et al., Formation of Novel Al2O3 Surface (Al–O*) by Plasma-Excited Nitrogen and its Catalytic Application–Production of Ammonia and Oxygen from Nitrogen and Water, Applied Surface Science 121/122 pp. 351–354 (1997).

* cited by examiner

Primary Examiner—Wayne A. Langel
Assistant Examiner—Maribel Medina
(74) Attorney, Agent, or Firm—Kalow & Springut, LLP

(57) ABSTRACT

A process is disclosed for the plasma-catalytic production of ammonia. A gas stream containing nitrogen and water vapor is passed through an electrical gas discharge in the discharge space of which is arranged a catalyst which contains a catalytically active component of at least one metal which can be titanium, zirconium, hafnium, vanadium, niobium, tantalum, chromium, molybdenum, tungsten, iron, ruthenium, osmium, cobalt, rhodium, iridium, nickel, palladium, platinum, manganese or copper on a support.

13 Claims, 2 Drawing Sheets

PROCESS FOR THE PLASMA-CATALYTIC PRODUCTION OF AMMONIA

INTRODUCTION AND BACKGROUND

The present invention relates to a process for the plasma-catalytic production of ammonia.

Ammonia synthesis is one of the most important industrial processes in chemistry. Ammonia is produced on an industrial scale from hydrogen and nitrogen by the well-known Haber-Bosch process.

Apart from the use for the preparation of fertilizers, ammonia is also becoming increasingly important in the removal of nitrogen oxides from waste gases containing oxygen by selective catalytic reduction of nitrogen oxides (SCR process; selective catalytic reduction), wherein the nitrogen oxides are reacted with ammonia on a suitable catalyst to nitrogen and water.

For the selective catalytic reduction of nitrogen oxides contained in lean exhaust gases of motor vehicles, simple processes for producing ammonia are required on board the vehicle. Apart from production by hydrolysis of urea, processes employing electrical gas discharges would be advantageous, since chemical reactions may be excited in such plasmas at low temperatures which are otherwise possible only at appreciably higher temperatures.

Kameoka et al. ("Formation of novel $Al_2O_3$ surface (Al—O*) by plasma-excited nitrogen and its catalytic application—production of ammonia and oxygen from nitrogen and water"; Applied Surface Science 121/122 (1997) 351–354) observed the formation of ammonia by reaction of excited nitrogen molecules $N_2^*$ with the hydroxyl groups on the surface of the alumina. The nitrogen molecules were excited in a high-frequency gas discharge (13.56 MHz, 60 W, 1 torr). The ammonia formed and adsorbed on the surface was desorbed and detected by heating the alumina in helium to 450° C. A second treatment of the alumina in the nitrogen plasma led to a drastic reduction in ammonia formation due to hydroxyl group depletion on the surface. It was not possible to restore the hydroxyl groups on the surface of the alumina by treatment in water vapor. The authors attributed this to the formation of a new surface state Al—O* of the alumina due to the excited nitrogen. The excited nitrogen is composed of radicals ($N_2^*, N^*$) and/or ions ($N_2^+$, etc):

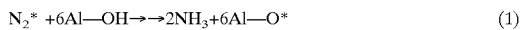
$$N_2^* + 6Al—OH \rightarrow \rightarrow 2NH_3 + 6Al—O^* \qquad (1)$$

In reaction equation (1), only $N_2^*$ is given to represent all the possible excited nitrogen components. The original hydroxylated surface state of the alumina could be restored only by treating the alumina in water (liquid). In so doing, cleavage of oxygen occurred, in accordance with the following reaction equation:

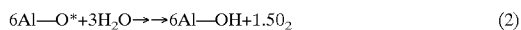
$$6Al—O^* + 3H_2O \rightarrow \rightarrow 6Al—OH + 1.5O_2 \qquad (2)$$

The following equation for the process as a whole is obtained from reaction equations (1) and (2):

$$N_2^* + 3H_2O \rightarrow \rightarrow 2NH_3 + 1.5O_2 \qquad (3)$$

In the summation equation (3) it should be borne in mind that the process described thereby does not take place continuously but requires a constant switching between ammonia formation and hydroxylation on the surface of the alumina. Moreover, this process takes place not at normal pressure but at a pressure of only 1 torr. Moreover, the ammonia formed must be desorbed from the surface at elevated temperatures.

An object of the present invention was, therefore, to enable the production of ammonia continuously and at low temperatures with the aid of an electrical gas discharge plasma.

SUMMARY OF THE INVENTION

The above and other objects can be achieved according to the present invention by passing a gas stream containing nitrogen and water vapor through an electrical gas discharge in the discharge space of which is arranged a catalyst which contains a catalytically active component comprising at least one metal selected from the group consisting of titanium, zirconium, hafnium, vanadium, niobium, tantalum, chromium, molybdenum, tungsten, iron, ruthenium, osmium, cobalt, rhodium, iridium, nickel, palladium, platinum, manganese and copper on a support. Mixtures thereof can also be used.

The process according to the invention may also be described by reaction equation (3). Unlike the known process, however, the formation of ammonia in the present process takes place continuously. To this end, nitrogen and water vapor are passed through the gas discharge simultaneously. This alone, however, does not lead to success. Rather, an important factor for the process is the arrangement of a suitable catalyst in the gas discharge.

BRIEF DESCRIPTION OF DRAWINGS

The invention will now be explained in more detail on the basis of FIGS. 1 to 4 and the two examples.

DETAILED DESCRIPTION OF INVENTION

Figure 1:
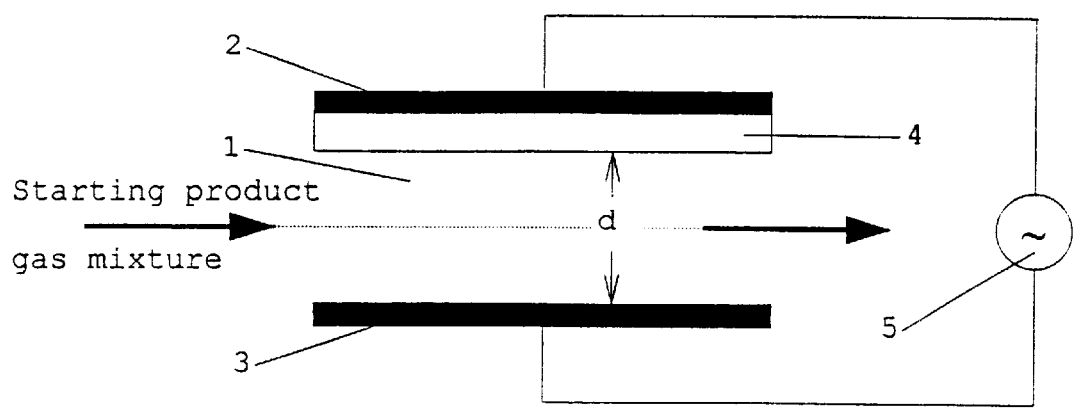
FIG. 1 is a schematic cross sectional view of a dielectric barrier discharge reactor with parallel, plane electrodes; dielectric barrier on one side.

A supported catalyst according to the present invention which contains the above-mentioned catalytically active metals on a support is suitable for the purposes of the process described herein. According to the present understanding of the invention, the hydrogen-adsorbing property of these metals is important. This is because the water vapor molecules of the gas stream are dissociated to radicals and ions (for example $OH^-$ and $H^+$ ions) due to the action of the gas discharge. The hydrogen is adsorbed at least partially by the catalyst and is thus available for the formation of ammonia by contact with the nitrogen excited by the gas discharge; the excited nitrogen may be composed of the components already mentioned.

In an electrical gas discharge, for example, based on transient glow discharges, a so-called non-thermal plasma develops in which each partial system of the plasma, the electron gas, the ion gas and the neutral gas, has its own temperature. For the purposes of the invention, a large number of different, non-thermal gas discharge plasmas may be used. Depending on the pressure in the discharge space and on the type of electrical excitation, different types of discharge are formed. Examples include direct current corona discharge, positive corona discharge, high-frequency and microwave discharge and barrier discharge. The latter is, by nature, a rapidly quenching, transient glow discharge.

The process according to the invention may be carried out in various pressure ranges, depending on the type of discharge selected. More particularly, high-frequency and microwave discharges, corona discharges, barrier discharges or mixed forms thereof may be used. Barrier discharges are used in preference because they may be operated at atmospheric pressure. The barrier discharge, or dielectric barrier discharge—abbreviated to DBD or silent discharge, is a plasma source requiring little in the way of equipment. It is a high pressure glow discharge operated with a.c. voltage. It comprises a large number of rapidly quenching microdischarges.

At relatively high pressures, a thermal equilibrium usually forms in the discharge within 0.1 to 1 $\mu$s due to collision interactions between all the particles. In order to prevent this in the case of barrier discharge, the discharge space between the electrodes is furnished with at least one dielectric layer which seals and interrupts the discharge space by capacitive means. The dielectric barriers prevent the gas discharge forming a thermal equilibrium after being ignited. They prevent leakage, as a result of which an opposing field is created and the individual or microdischarges are quenched in good time before the onset of thermalisation. The individual discharges are extinguished after about 10 to several 100 ns, depending on the discharge arrangement, gas composition and at a typical pressure of one bar. In view of the short duration of the discharge, the gas temperature rises only insignificantly despite high electron energies of up to 10 eV in one microdischarge.

In the case of DBD, the plasma is generated by applying an A.C. voltage between two electrodes facing each other separated by a certain gap d. The space between the two electrodes is the discharge space. The arrangement of electrodes and discharge space is also known hereinafter as the plasma reactor.

The electrodes may be designed as plates or shaped to concentric tubes. The dielectric or the dielectric layer is applied directly to one or both electrodes. A dielectric barrier discharge is then obtained on one or both sides. A.C. voltages with frequencies between 50 Hz and 1 MHz may be used.

By shaping the electrodes in a suitable way it is possible to produce non-homogeneous, electrical field distributions which, due to a field effect, lead to a lower ignition voltage compared with a plate arrangement with the same gap between the electrodes. The so-called packed bed reactor is a special case, in which the discharge space is filled with an irregular packing of beads, hereinafter also known as pellets, of dielectric material, and in this case too a dielectric barrier is applied to at least one of the two electrodes.

Preferably, packed bed reactor is used for the process according to the invention. This type of reactor makes it possible to achieve a higher electron temperature in the gas discharge due to the development of e.g. sliding discharges on the surface of the pellets. Advantageously, the catalyst itself is shaped into such pellets or molded bodies. The molded bodies then contain the catalytically active components distributed homogeneously over their volume. They therefore form a so-called solid catalyst.

As the formation of radicals due to e.g. sliding discharges takes place on the surface of the molded bodies of the packed bed reactor, it is particularly advantageous if the catalyst is in the form of a so-called shell-type catalyst. In such a catalyst, the catalytically active components are situated only in the surface shell or layer of the molded bodies and therefore have optimum contact with the excited gas components formed in the sliding discharges. The excited gas components may therefore interact with the catalyst within their lifetime of a few microseconds and less.

The preparation of shell-type catalysts is known to the skilled person in the art. To this end, the support for the catalyst is shaped into molded bodies which are then impregnated with an aqueous or organic solution of a soluble precursor compound of the catalytically active component (for example, iron nitrate). By conducting the impregnation process in a suitable manner, the catalytically active components may be precipitated in a surface shell of adjustable thickness. After impregnation, the precursor compounds of the catalytically active components are converted to the catalytically active metals by calcination and optionally reduction. These techniques are well known.

Supports for the catalytically active components are preferably materials with a large surface area. A large surface area within the scope of this invention and as used herein is taken to mean materials whose specific BET surface (measured by evaluation of nitrogen adsorption isotherms in conformity with DIN 66132) is more than 5 $m^2/g$. Particularly suitable materials are titania, alumina, silica, cerium oxide, zirconia, zeolites and mixtures thereof or mixed oxides.

As an alternative to the solid and shell-type catalysts described, the catalyst may also be designed as a coated catalyst. To this end, the catalyst is applied to suitable molded bodies in the form of a thin surface coating with a thickness of, for example, 1 to 100 $\mu$m. Molded bodies used in preference are made of dielectric, ceramic materials or glasses which are inert towards the radicals in the gas discharge. Suitable ceramic materials are e.g. alumina, zirconia, titania, cordierite and mullite.

The process according to the invention may be operated at various reaction temperatures in the plasma reactor. Its advantages, however, lie in the fact, amongst others, that it is fully functional even at low temperatures between room temperature and about 200° C. In many cases, it is even possible to operate directly at room temperature. It is also possible, therefore, to produce the molded bodies for the coating catalysts from organic materials which are stable towards the reaction temperatures and the radicals in the gas discharge. Suitable organic materials are, for example, organic polymers with an insulation resistance of more than $10^6$ $\Omega\Omega$·cm.

The shape of the catalyst bodies is largely optional. All the shapes known from fixed bed catalysis may be used. Beads (pellets), tablets or rings are preferably used. They should offer the least possible flow resistance to the gas flow. It is also possible to use so-called honeycombs through which run a large number of parallel flow channels for the reaction gases. The honeycombs may be designed as solid catalysts or may have a coating of the walls of the flow channels with the catalyst. The measures for the preparation of such catalysts are well known to the skilled person.

According to reaction equation (3) the stoichiometric ratio between nitrogen and water vapor is 1:3. In the practical execution of the process, however, a molar ratio between nitrogen and water vapor in the gas stream from 100:1 to 10:1 has proved to be advantageous, the majority of the nitrogen acting as carrier gas.

FIG. 1 schematically shows the structure of a plasma reactor in which a dielectric barrier discharge may be ignited. Parallel plates (2) and (3) denote two metal electrodes facing one another and linked with an a.c. voltage source (5). They delineate the discharge space (1) through which the starting product gas mixture is fed. In order to prevent the development of a discharge arc between the two electrodes, electrode (2) is coated with a dielectric (4). Such a discharge is known as a one-side hindered Dielectric Barrier Discharge (DBD).

By applying an a.c. voltage to the two electrodes, the desired discharge is obtained if the voltage is sufficient. The a.c. voltage may have various forms e.g. sinusoidal, triangular, square-wave). Similarly, the voltage may be pulsed with various duty factors or degrees of modulation.

The magnitude of the voltage required depends on the free gap d between dielectric and counterelectrode, the dielectric used and the pressure in the discharge path, the gas composition, the rate of increase of the voltage and on any components present between the dielectrics in the discharge space. The gap d is preferably between 0.1 and 10 mm. The voltages required may be up to and above 15 kV. The selected frequency of the a.c. voltage may be between 50 Hz and 1 MHz.

Figure 2:
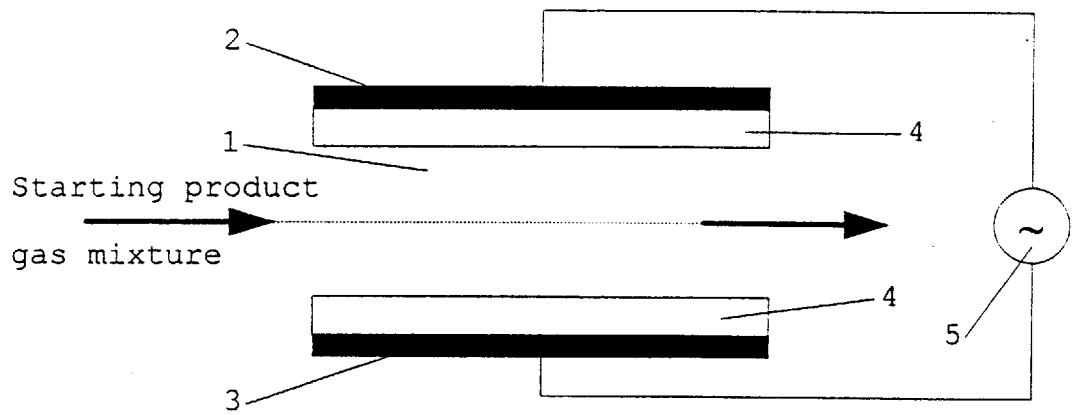
FIG. 2 is a schematic cross sectional view of a dielectric barrier discharge reactor with parallel, plane electrodes; dielectric barrier on both sides

FIG. 2 shows a modification of the arrangement of FIG. 1. In FIG. 2, both electrodes (2) and (3) are coated with a dielectric (4). The gas discharge developing in the discharge space is therefore known as a double-side hindered DBD.

Figure 3:
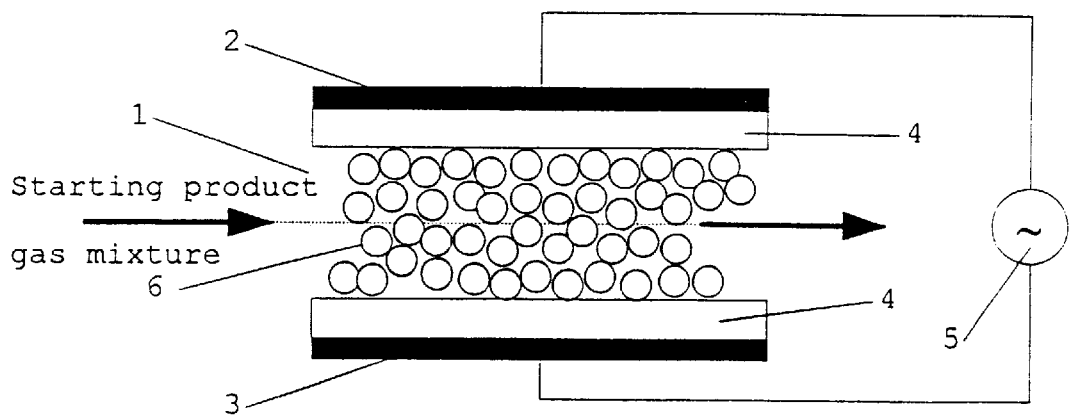
FIG. 3 is a schematic cross sectional view of a dielectric barrier discharge reactor with parallel, plane electrodes; dielectric barrier on both sides; discharge space filled with pellets.

FIG. 3 shows a plasma reactor which is particularly suitable for carrying out the process. The discharge space is filled with the catalyst bodies (6). The electrical discharge developing in the reactor filled with the catalyst bodies takes place primarily in the form of e.g. sliding discharges on the surface of the catalyst bodies. As a result, the concentration of ions and radicals in the spatial vicinity of the surface is very high.

In addition to the catalyst bodies or as an alternative thereto, the dielectric on the electrode surfaces may be provided with a catalytically active layer. In certain applications, the dielectric on the electrode surfaces may itself be designed as a catalytically active layer. This presupposes that the insulating effect of the layer satisfies the requirements of a dielectric barrier discharge.

The electrodes of the plasma reactor may take the form of plane formations aligned parallel to one another or a coaxial arrangement with a central electrode which is surrounded by a tubular electrode. In order to facilitate the development of discharge filaments, spatial inhomogeneities may be provided which lead to local field overshoots and hence to the development of the discharge. As is known from the literature, the energy coupled into electrons in a plasma discharge is dependent on the product of electrode gap d and pressure p (d*p), so that when the gas pressure is constant, certain radical reactions may be promoted or suppressed in the plasma solely by altering the geometry of the reactor. For the proposed process, the product of electrode gap and pressure should be from 0.1 to 100 mm*bar.

The discharge may be excited by various types of a.c. voltages. Pulsed excitation voltages are particularly suitable for a high electron density and if possible the simultaneous development of the discharge in the entire discharge space of the reactor. These a.c. voltages may also be modulated with low frequency (for example, 100 to 0.01 Hz), in order to permit the reaction of adsorbed species.

The reactor may be produced from any material with suitable electrical and thermal properties. More particularly, plastics, ceramics and glasses may be mentioned. Similarly, hybrid structures of different materials are possible.

Figure 4:
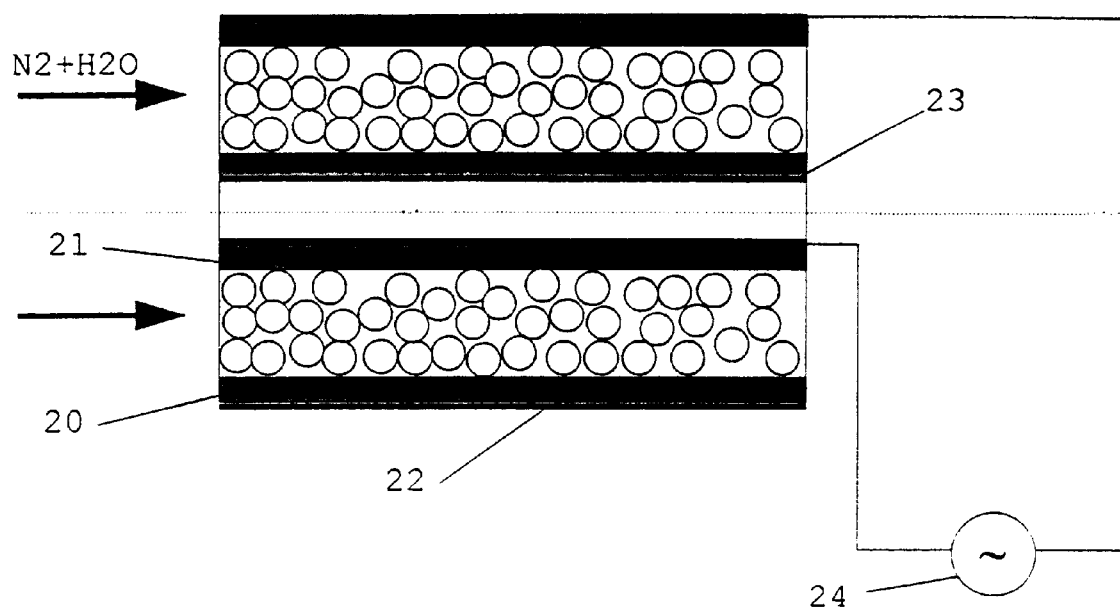
FIG. 4 is a schematic cross sectional view of a coaxial reactor with pellet catalyst.

The following tests were carried out in a coaxial plasma reactor according to FIG. 4. As seen in cross-section, (20) denotes an outer tube and (21) an inner tube of quartz glass. The inner surface of the inner tube and the external surface of the outer tube are coated with metal electrodes (23) and (22). By applying a voltage source (24) to these electrodes, a dielectric barrier discharge may be ignited in the annular space between the inner and outer tube.

The outer and inner tubes were composed, for example, of 2 mm thick quartz glass. The outer tube had an external diameter of 4 cm and the inner tube an internal diameter of 2.6 cm. The length of the reactor was 20 cm and the length of the electrodes 16 cm.

EXAMPLE

A catalyst coated with iron was prepared on alumina pellets (specific surface: 50 m$^2$/g; 1.5 to 3 mm diameter). To this end, the alumina pellets were impregnated with a solution of iron nitrate, dried and calcined at 500° C. under forming gas (95 vol. % of nitrogen, 5 vol. % of hydrogen). The finished catalyst contained 150 g/ft$^3$ iron.

The gas discharge space between the two quartz tubes of the plasma reactor was filled with this catalyst. A gas mixture of 97.4 vol. % of nitrogen and 2.6 vol. % of water vapor (molar ratio $N_2/H_2O=37.5:1$) was passed through the reactor at temperatures from 100 to 150° C. at a space velocity of 17000 h$^{-1}$.

By applying a sinusoidal voltage of 2 kHz and a voltage of 14 kV a barrier discharge was ignited. The electric power supplied to the discharge was 5 W. The gas mixture emerging from the reactor was analyzed by spectroscopy. The three absorption bands of ammonia could be identified clearly between 200 and 210 nm. The concentration of the ammonia produced in the product gas mixture was 20 ppm.

Comparison Example

The test of the above example was repeated. However, the alumina pellets coated with iron were replaced by uncoated alumina pellets. No ammonia could be detected in the product gas mixture.

Similar results can be obtained by replacing iron with one of the other catalytically active components defined above and using alumina pellets as the carrier or one of the other materials mentioned above such titania, silica, cerium oxide, zirconia, zeolites, mixtures thereof and mixed oxides.

Further variations and modifications will be apparent to those skilled in the art from the foregoing and are inteded to be encompassed by the claims appended hereto. German application 199 51 976.5 is relied on and incorporated herein by reference.

We claim:

1. A process for the plasma-catalytic production of ammonia, comprising passing a gas stream containing nitrogen and water vapor through an electrical gas discharge in a discharge space containing a catalyst which contains a catalytically active component of at least one metal selected from the group consisting of titanium, zirconium, hafnium, vanadium, niobium, tantalum, chromium, molybdenum, tungsten, iron, ruthenium, osmium, cobalt, rhodium, iridium, nickel, palladium, platinum, manganese, copper and mixture thereof on a support.

2. The process according to claim 1, wherein said gas discharge is a dielectric barrier discharge, a microwave discharge, a corona discharge or mixed forms thereof.

3. The process according to claim 1, wherein said gas discharge is a dielectric barrier discharge with a frequency between 50 Hz and 1 MHz.

4. The process according to claim 1, wherein said gas stream contains water vapor and nitrogen in the molar ratio between 100:1 and 10:1.

5. The process according to claim 1, wherein said support for the catalytically active component is selected from the group consisting of titania, alumina, silica, cerium oxide, zirconia, zeolites, mixtures thereof and mixed oxides thereof with a specific surface of more than 5 m$^2$/g.

6. The process according to claim 1, wherein the catalyst is shaped into molded bodies.

7. The process according to claim 1, wherein the support is shaped into molded bodies and the catalytically active component is incorporated in the molded bodies only in a surface shell.

8. The process according to claim 1, the catalyst is in the form of a surface coating on molded bodies of a dielectric, ceramic material or a glass.

9. The process according to claim 7, the catalyst is in the form of a surface coating on molded bodies of an organic polymer with an insulation resistance of more than $10^6$ ΩΩ·cm.

10. The process according to claim 1 further comprising continuously passing said gas stream through said electrical discharge.

11. The process according to claim 10 further comprising controlling pressure inside said space to obtain a desired electrical discharge.

12. The process according to claim 10 further comprising applying an a.c. voltage to the the electrodes to obtain the desired discharge.

13. The process according to claim 12 wherein the voltage is pulsed.

* * * * *